US005640570A

United States Patent [19]
St. Clair et al.

[11] Patent Number: 5,640,570
[45] Date of Patent: Jun. 17, 1997

[54] INFORMATION HANDLING SYSTEM FOR TRANSMITTING CONTENTS OF LINE REGISTER FROM ASYNCHRONOUS CONTROLLER TO SHADOW REGISTER IN ANOTHER ASYNCHRONOUS CONTROLLER DETERMINED BY SHADOW REGISTER ADDRESS BUFFER

[75] Inventors: Joe Christopher St. Clair, Round Rock; Steven Mark Thurber, Austin, both of Tex.

[73] Assignee: International Business Machines Corporation, Armonk, N.Y.

[21] Appl. No.: 592,272

[22] Filed: Jan. 26, 1996

[51] Int. Cl.⁶ .................................................. G06F 15/02
[52] U.S. Cl. ........................................ 395/733; 395/824
[58] Field of Search .................................. 395/306, 307, 395/308, 729, 800, 821, 733, 734, 735, 736, 737, 738, 739, 741, 310, 868, 824

[56] References Cited

U.S. PATENT DOCUMENTS

| | | | |
|---|---|---|---|
| 5,146,595 | 9/1992 | Fujiyama et al. | 395/736 |
| 5,287,523 | 2/1994 | Allison et al. | 395/870 |
| 5,371,742 | 12/1994 | Brown et al. | 395/181 |
| 5,379,384 | 1/1995 | Solomon | 395/308 |
| 5,381,541 | 1/1995 | Begun et al. | 395/500 |
| 5,410,708 | 4/1995 | Miyamori | 395/737 |
| 5,426,739 | 6/1995 | Lin et al. | 395/309 |
| 5,448,743 | 9/1995 | Gulick et al. | 395/869 |
| 5,517,648 | 5/1996 | Bertone et al. | 395/732 |
| 5,519,872 | 5/1996 | Khandekar | 395/775 |
| 5,530,873 | 6/1996 | Takano | 395/733 |
| 5,530,891 | 6/1996 | Gephardt | 395/800 |
| 5,530,946 | 6/1996 | Bouvier et al. | |
| 5,533,204 | 7/1996 | Tipley | 395/288 |
| 5,535,341 | 7/1996 | Shah et al. | 395/306 |
| 5,535,419 | 7/1996 | O'Brien | 395/856 |

OTHER PUBLICATIONS

"An I/O System on a chip", by Anthony L., Hewlett–Packard Journal, V 46, N 2, p. 36(7), Apr. 1995.

"Managing PA–RISC machines for real–time systems", by Anzinger, George, Hewlett–Packard Journal, V 44, N 4, p. 31(7), Aug. 1993.

Primary Examiner—Lance Leonard Barry, Esq.
Assistant Examiner—Moustafa Mohamed Meky
Attorney, Agent, or Firm—Anthony V. S. England; Jenkens & Gilchrist; Raymond M. Galasso

[57] ABSTRACT

An information handling system includes one or more processors, a system bus or network connecting the processors, a memory system connected to the system bus, an asynchronous signal controller connected to the system bus, one or more I/O bridges connected to the system bus, an I/O bus connected to each I/O bridge, one or more devices connected to the I/O bus, including perhaps another I/O-bus-to-I/O-bus bridge where additional devices may be connected to a second I/O bus, wherein the first or host bridge includes remote interrupt control logic having a register wherein an input to each position in the register is from one of the I/O devices downstream from the host bridge, and a shadow register address buffer, both under the control of a sample circuit connected to outputs of the register such that when a change in any register position is detected by the sample circuit, the entire contents of the register are sent to the shadow register indicated in the shadow register address buffer by a processor bypass technique such as the well known direct memory access technique.

5 Claims, 2 Drawing Sheets

INFORMATION HANDLING SYSTEM FOR TRANSMITTING CONTENTS OF LINE REGISTER FROM ASYNCHRONOUS CONTROLLER TO SHADOW REGISTER IN ANOTHER ASYNCHRONOUS CONTROLLER DETERMINED BY SHADOW REGISTER ADDRESS BUFFER

BACKGROUND OF THE INVENTION

1. Technical Field of the Invention

The present invention relates to information handling systems, and more particularly to information handling systems with improved controllers for handling asynchronous signals.

2. Prior Art

In the prior art there are many techniques for handling interrupts from a large number of potential interrupt sources such as I/O devices which require interrupts of the processor or processors in an information handling system. However, there are not many efficient techniques for handling other types of asynchronous signals, such as, power supply condition indicators, fan condition indicators, temperature condition indicators and adapter card present indicators. It should be understood that there are other asynchronous signals which are not identified herein which may be efficiently handled by the present invention.

It is common in the prior art to have a central interrupt controller with a line from each interrupt source to the interrupt controller. In many distributed systems where I/O may be connected to processors by a network and may be at some distance from the processor or from an interrupt controller, a more efficient manner of handling asynchronous occasional signals is desired.

SUMMARY OF THE INVENTION

Therefore, it is an object of the present invention to efficiently handle asynchronous signals in a distributed information handling system without the need for dedicated lines between each asynchronous signal source and a central asynchronous signal controller.

Accordingly, an information handling system includes one or more processors, a system bus or network connecting the processors, a memory system connected to the system bus or network, an asynchronous signal controller connected to the system bus, one or more I/O bridges connected to the system bus or controller, an I/O bus connected to the I/O bridge, one or more devices connected to the I/O bus, including perhaps another I/O-bus-to-I/O-bus bridge where additional devices may be connected to a second I/O bus, wherein the first or host bridge includes a remote asynchronous signal control logic unit having a register wherein an input to each position in the register is from an asynchronous signal source downstream from the host bridge, and a shadow register address buffer, both under the control of a sample circuit connected to outputs of the register such that when a change in any register position is detected by the sample circuit, the entire contents of the register are sent to the shadow register indicated in the shadow register address buffer by a processor bypass technique such as the well known direct memory access (DMA) technique.

It is a feature of the present invention that asynchronous signal sources in large systems having large numbers of devices may be readily and efficiently handled by a mechanism which uses a processor bypass technique such as direct memory access to transmit contents of a remote line register to a shadow register in an asynchronous signal controller with minimum latency time between the raising of the request and the presentation of the request to the appropriate processor.

Other features and advantages of the present invention will become apparent in the following detailed description of the preferred embodiment of the invention taken in conjunction with the accompanying drawing.

DETAILED DESCRIPTION OF A PREFERRED EMBODIMENT OF THE INVENTION

Figure 1:
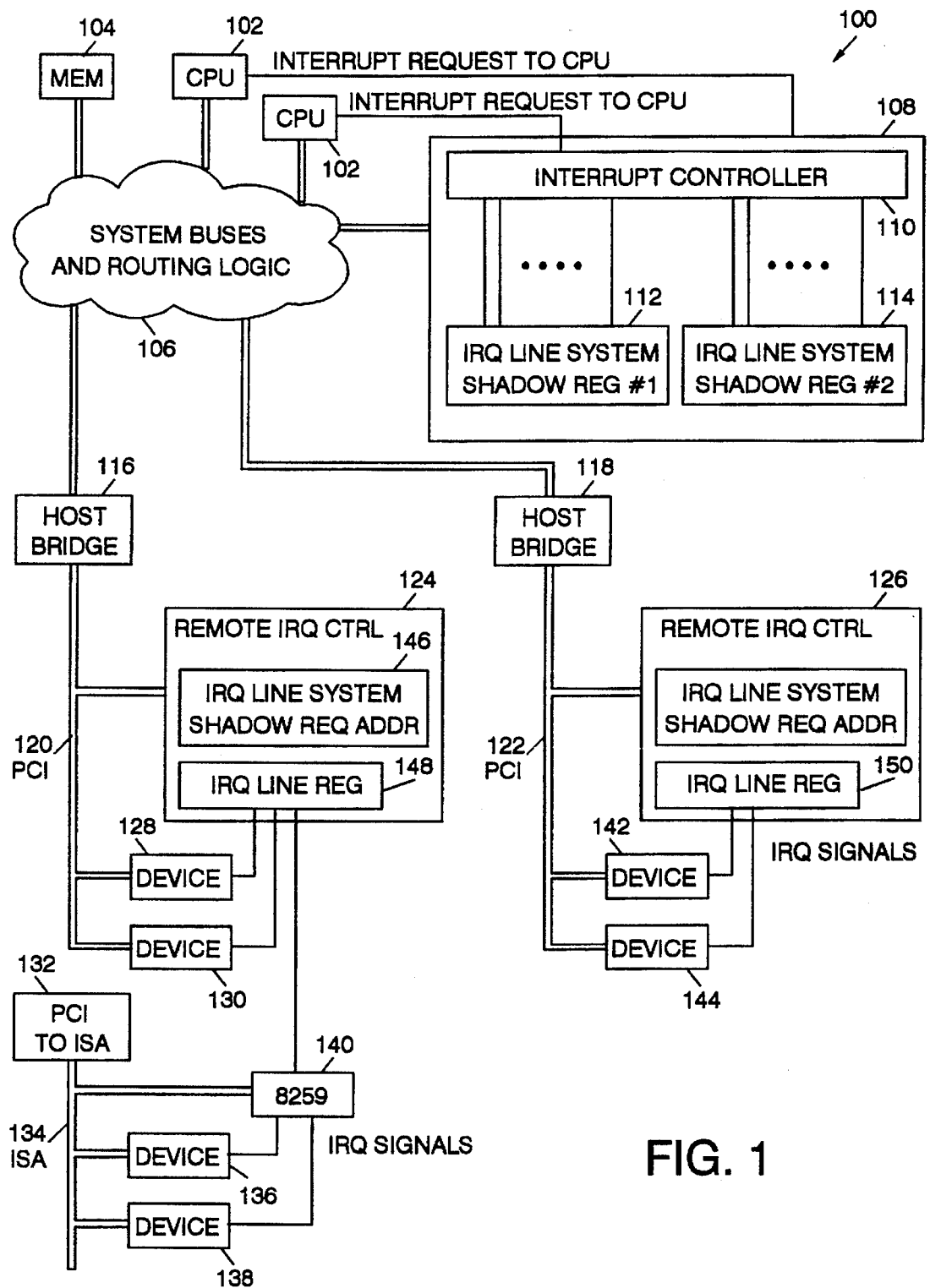
FIG. 1 is a block diagram of an information handling system in accordance with the present invention.

Referring now to FIG. 1, an information handling system embodying the present invention will be described.

Information handling system 100 includes a number of processors 102, a memory system 104, a system bus or network including routing logic 106, an interrupt controller 108 which receives interrupt requests from interrupt sources such as I/O devices, or other asynchronous signal sources and directs requests to an appropriate processor 102. Also attached to system bus or network 106 are one or more host bridges 116, 118. The host bridges bridge between the system bus 106 and an I/O bus such as the PCI bus 120, 122. A number of devices such as 128, 130, 142, and 144 may be connected to PCI buses 120 and 122 respectively. Also connected to PCI bus 120 and 122 are remote interrupt controllers 124 and 126, respectively.

It should be noted that the remote interrupt controllers 124 and 126 could easily be contained within host bridges 116 and 118, respectively.

Also connected to PCI bus 120 is a PCI-to-ISA bridge 132 to allow the connection of an ISA bus 134 to the system. Devices 136 and 138 are connected to ISA bus 134. Also connected to ISA bus 134 is device 140. Device 140 may be implemented by an Intel 8259 integrated circuit. Each of the devices 128, 130, 136, 138, 142, and 144 has an interrupt line connected to an input of either interrupt line register 148 or interrupt line register 150.

Figure 2:
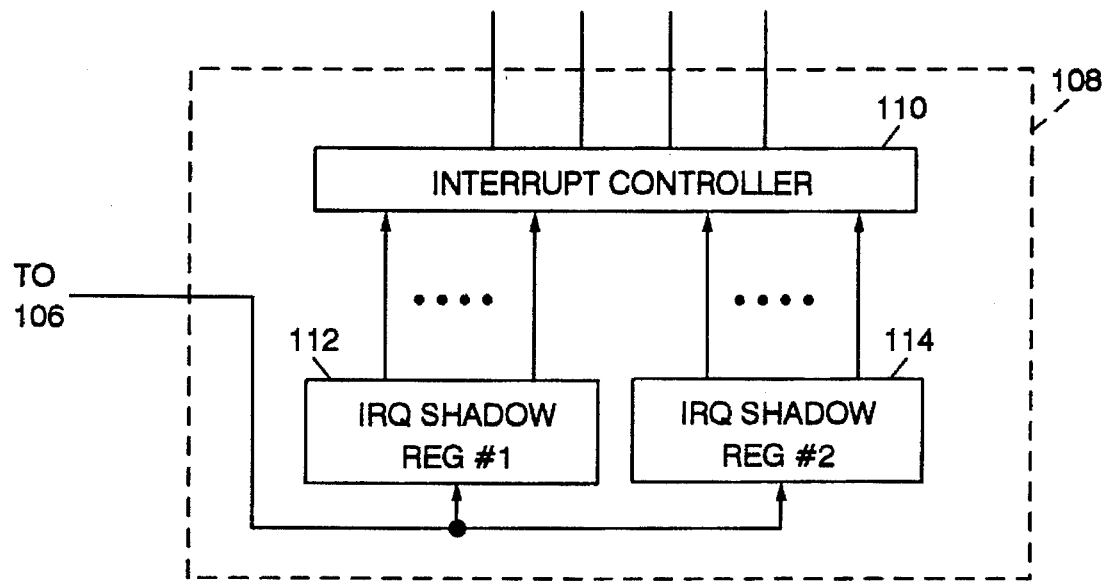
FIG. 2 is a block diagram of an asynchronous signal controller in accordance with the present invention.
Figure 3:
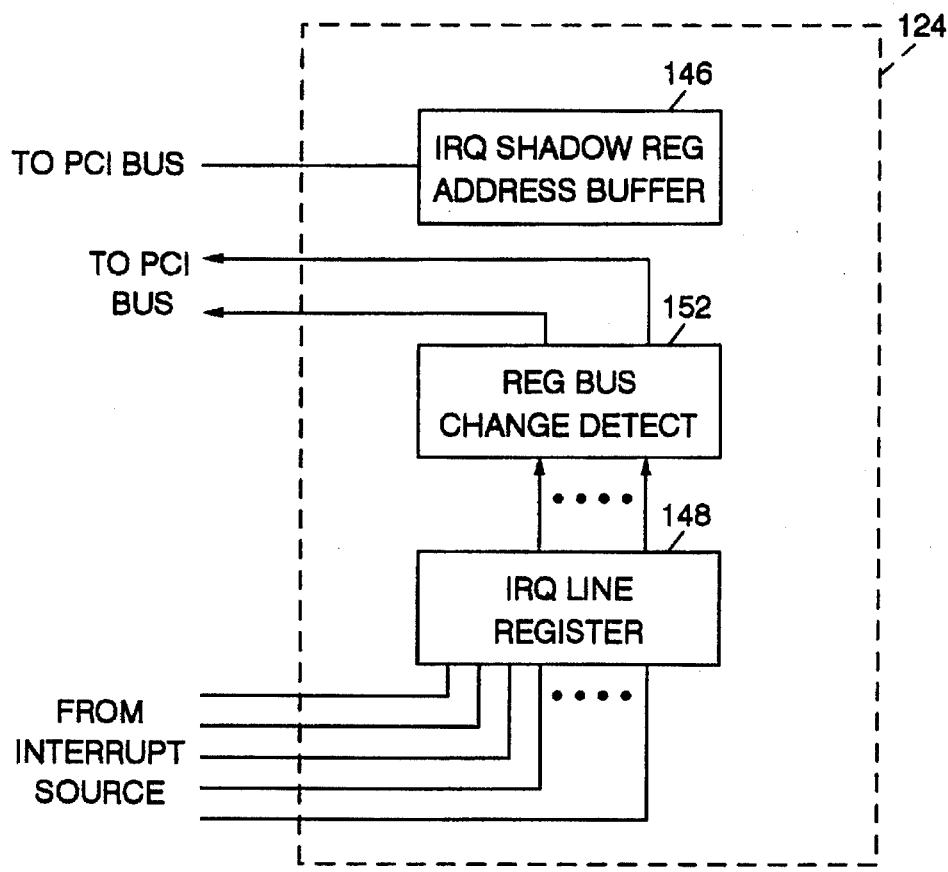
FIG. 3 is a block diagram of a remote asynchronous signal controller in accordance with the present invention.

Referring now to FIGS. 2 and 3, the interrupt handling mechanism in accordance with a preferred embodiment of the present invention will be described in more detail.

Interrupt lines input to Interrupt line register 148 in remote interrupt controller 124 from the various interrupt sources 128, 130, 136, or 138, respectively, are monitored by the register bit change detect circuit 152. When any bit in interrupt line register 148 changes, the contents of interrupt line register 148 are transmitted to an interrupt shadow register in interrupt controller 108 identified by the address in interrupt shadow register address buffer 146 by DMA transfer.

The mechanism for the transfer of the contents of interrupt line register 148 to interrupt shadow registers 112 or 114, depending upon the address in interrupt shadow register address buffer 146, is handled by a direct memory access (DMA) process which is well known in the art. DMA was the subject of U.S. Pat. No. 3,812,475 to Christensen et al. filed in 1957. The Christensen et al. patent is incorporated by reference herein. DMA has been widely used for transfers between units in an information handling system without processor intervention.

The outputs of interrupt shadow register 112 and 114 in interrupt controller 108 are connected to the interrupt controller logic 110 which determines bit position of the raised interrupt which is associated with a particular device such as device 128 and sends an interrupt request representing an interrupt from device 128, for example, to one of processors 102. The interrupt line outputs of interrupt controller logic 110 shadow the source interrupt lines from the I/O devices such as device 128.

The number of bit positions in interrupt line register 148 or interrupt shadow registers 112 and 114 is based upon the number of devices which may be considered as interrupt sources. A practical register size might be 16 or 32 bits representing 16 to 32 devices which could be considered interrupt sources.

By including a remote interrupt controller and a central interrupt controller in an information handling system, interrupts from all interrupt sources can be efficiently handled over existing system buses so long as the interrupt activity is low when compared to the processing cycle of the system.

Since the processor clock cycle is generally less than 20 nanoseconds and asynchronous signals which occur less than 1000 times per second, such asynchronous signals do not represent a significant degradation of system performance. Therefore, the asynchronous signal control mechanism in accordance with the present invention provides a cost effective and practical solution.

Individual components which are included in the information handling system according to the present invention are not described in detail, since the individual components are well known in the art and in many instances commercially available.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. An information handling system, comprising:

one or more processors;

a system bus connected to the one or more processors;

a memory system connected to the system bus;

a first asynchronous signal controller connected to the system bus;

one or more I/O bridges connected to the system bus;

a first I/O bus, operating under a first protocol, connected to each I/O bridge;

one or more devices connected to each I/0 bus; and a second asynchronous signal controller, connected to one of the I/O buses for detecting a request from an asynchronous signal source, and transmitting the request to the first asynchronous signal controller using processor bypass transmission; and wherein the second asynchronous signal controller further comprises:

a line register having a bit position for each device which is a potential asynchronous signal source;

a shadow register address buffer; and a sample circuit connected to outputs of the line register such that when a change in any register bit position is detected by the sample circuit, the contents of the line register are transmitted to the shadow register indicated in the shadow register address buffer by processor bypass transmission;

wherein the shadow register address buffer stores an address of a shadow register in the first asynchronous signal controller to which the contents of the line register is transmitted when an asynchronous signal line changes state.

2. An information handling system, according to claim 1, further comprising:

one or more I/O bus to I/O bus bridges; and one or more devices connected to a second I/O bus.

3. An information handling system, according to claim 2, wherein said second I/O bus operates under a second protocol.

4. An information handling system, according to claim 1, wherein the processor bypass transmission is accomplished by a direct memory access means.

5. An information handling system, according to claim 1, wherein the first asynchronous signal controller further comprises:

one or more shadow interrupt line registers each having a bit position for each device which is a potential asynchronous signal source; and control logic for directing a detected request to one of the one or more processors.

* * * * *